United States Patent
Le Polles

(10) Patent No.: US 10,774,738 B2
(45) Date of Patent: Sep. 15, 2020

(54) CLEANING INSTALLATION FOR AN INTERNAL COMBUSTION ENGINE

(71) Applicant: FLEX FUEL—ENERGY DEVELOPMENT, Valbonne (FR)

(72) Inventor: Sébastien Alain Le Polles, Montigny-sur-Loing (FR)

(73) Assignee: Flex Fuel—Energy Development, Valbonne (FR)

( * ) Notice: Subject to any disclaimer, the term of this patent is extended or adjusted under 35 U.S.C. 154(b) by 0 days.

(21) Appl. No.: 16/495,975

(22) PCT Filed: Mar. 19, 2018

(86) PCT No.: PCT/IB2018/051821
§ 371 (c)(1),
(2) Date: Sep. 20, 2019

(87) PCT Pub. No.: WO2018/172910
PCT Pub. Date: Sep. 27, 2018

(65) Prior Publication Data
US 2020/0131986 A1    Apr. 30, 2020

(30) Foreign Application Priority Data
Mar. 20, 2017   (FR) .................................. 17 70270

(51) Int. Cl.
*F02B 77/04*    (2006.01)
*F02B 3/06*    (2006.01)
*F01D 25/00*    (2006.01)
*F02B 75/12*    (2006.01)
*F02D 41/00*    (2006.01)
*F02M 25/00*    (2006.01)

(52) U.S. Cl.
CPC ................ *F02B 77/04* (2013.01); *F02B 3/06* (2013.01); *F01D 25/002* (2013.01); *F02B 2075/125* (2013.01); *F02D 41/0055* (2013.01); *F02M 25/00* (2013.01)

(58) Field of Classification Search
CPC ...... F02B 77/04; F02B 3/06; F02B 2075/125; F01D 25/002; F02D 41/0055; F02M 25/00
See application file for complete search history.

(56) References Cited

U.S. PATENT DOCUMENTS

| | | | |
|---|---|---|---|
| 5,131,229 | A | 7/1992 | Kriegler et al. |
| 6,073,638 | A | 6/2000 | Sasaki et al. |
| 2006/0218907 | A1 | 10/2006 | Lynch |
| 2008/0283098 | A1 | 11/2008 | Ogasawara et al. |

FOREIGN PATENT DOCUMENTS

| | | |
|---|---|---|
| EP | 0 412 076 | 2/1991 |
| FR | 2 880 069 | 6/2006 |
| WO | WO 2009/156670 | 12/2009 |

*Primary Examiner* — Jacob M Amick
*Assistant Examiner* — Charles Brauch
(74) *Attorney, Agent, or Firm* — Occhiuti & Rohlicek LLP

(57) ABSTRACT

An installation for cleaning a motorization system includes an injector, a diagnostic device, and a controller. The injector executes a cleaning sequence for cleaning the motorization system. It does so by injecting a cleaning fluid into one of the inlets. The diagnostic device determines a soiling level as a function of a defect level. The soiling level is indicative of a level of soiling of the motorization system and the defect level is indicative of a level of defectiveness of the first moving part. The controller is configured to supply cleaning parameters to the injection devices for execution of the cleaning sequence. These cleaning parameters depend on the soiling level.

17 Claims, 2 Drawing Sheets

CLEANING INSTALLATION FOR AN INTERNAL COMBUSTION ENGINE

CROSS REFERENCE TO RELATED APPLICATION

This application is the national phase under 35 USC 371 of international application no. PCT/IB2018/051821, filed Mar. 19, 2018, which claims the benefit of the Mar. 20, 2017 priority date of French application no. 17/70270.

TECHNICAL FIELD AND PRIOR ART

The invention concerns an installation for cleaning a motorisation system comprising an internal combustion engine, installation of the type comprising an injection device adapted to inject a cleaning fluid into the engine. The invention is in particular beneficial for the maintenance of motor vehicles, such as cars, motor cycles, boats, . . . , but also for the maintenance of industrial engines such as those used for the production of energy, . . . .

To optimize the operation of an engine, the aim is often to lower the combustion temperature and to reduce the quantity of oxygen available inside the engine when running. This enables improvement of the performance of the engine and, in particular in the case of diesel engines, to reduce the production of NOx, particularly polluting nitrogen oxide compounds.

To lower the combustion temperature and to limit the quantity of oxygen, one technique developed in the 1970s consists in redirecting some of the inert exhaust gases to the fuel-air mixture inlet of the engine. An EGR (exhaust gas recirculation) valve with variable flow rate is positioned on the recirculation circuit between the exhaust and the inlet; the degree to which the valve is opened defines the quantity of exhaust gas that the EGR valve allows to pass in the direction of the inlet of the engine, the degree of opening is controlled by a computer of the vehicle, as a function of parameters of the engine such as a measured temperature of the exhaust gases, a power required from the engine, . . . . The production of nitrogen oxides depending in particular on temperature and the presence of oxygen during combustion, the introduction of burned gases operates on both parameters, temperature and proportion of oxygen.

Although reducing the combustion temperature enables reduced production of NOx and increased performance of the engine, it has other disadvantages. Indeed, there is less combustion in the engine, among other things because of the reduced oxygen content, which therefore generates more hydrocarbons and therefore more particles and soot. This has in particular the consequence of soiling the circuit of the engine, the burned gases exhaust circuit and the exhaust gases recirculation circuit. Considerable deposits of soot are therefore formed in the intake manifold, the turbocompressor and the EGR regulation valve, sometimes to such a point that engine fault messages can appear. The EGR regulation valve can also stick in the open position, which at full load means that a large quantity of exhaust gas is mixed with the combustion air. In the case of a motor vehicle, there are then a cloud of black smoke and a loss of power when the vehicle accelerates. Combustion at low temperature therefore reduces engine efficiency and increases the pollution generated by the engine.

A known technique for cleaning the engine and its circuits consists in injecting a cleaning fluid such as a mixture of hydrogen and oxygen gas into the inlet circuit while the engine is running. The oxidation of the hydrogen improves combustion which generates water vapour and carbon dioxide gas; at high temperature, the water vapour and the carbon dioxide gas react with the carbon deposit and therefore enable elimination of the carbon deposit. The patent application FR 15/02059 of the same applicant describes an installation for implementing this technique.

DESCRIPTION OF THE INVENTION

The invention aims to improve the efficiency of a known cleaning installation for cleaning a motorisation system comprising an internal combustion engine and a gas circulation circuit, the engine comprising a plurality of inlets for products to be burned and an exhaust gas outlet, the gas circulation circuit comprising a plurality of pipes and a plurality of moving parts arranged together to feed to one of the inlets of the engine an appropriate gas mixture, said plurality of moving parts comprising at least one moving part. The cleaning installation comprises an injection device adapted to execute a sequence for cleaning the engine by injecting a cleaning fluid into one of the inlets of the engine.

The installation according to the invention is characterized in that it also comprises diagnostic means adapted to determine a level of soiling of said motorisation system as a function of a level of defectiveness of at least one of the moving parts, and control means adapted to supply to the injection device injection parameters for the execution of the cleaning sequence, said injection parameters being a function of the level of soiling of the motorisation system.

In an installation according to the invention, the injection of cleaning fluid is therefore adjusted taking into account a level of soiling of the motorisation system as a function of a level of defectiveness of at least one moving part. The cleaning sequence is therefore adapted to the real needs of the engine, and not based only on a statistical state of soiling of the engine. This guarantees effective cleaning for all motorisation systems. This also enables better control of the overall consumption of cleaning fluid of the installation and the overall time of use of the cleaning installation.

The installation according to the invention can also be adapted for a motorisation system comprising a gas circulation circuit adapted to feed to the inlet of the engine an appropriate gas mixture comprising some of the exhaust gases available at the exhaust outlet of the engine.

The plurality of moving parts of the motorisation system taken into account in the context of the invention can comprise an inlet valve (which regulates the flow of a gas mixture comprising air with or without exhaust gas, said gas mixture arriving at one of the inlets of the engine), and/or an EGR valve and/or a moving member of a turbocompressor.

According to one embodiment, the diagnostic means are adapted to command movement of a moving part between two extreme positions, the other moving parts of the plurality of moving parts being retained in a fixed position, and to determine the level of defectiveness of said moving part as a function of a stroke travelled between the two extreme positions of the moving part and as a function of a theoretical maximum stroke of said moving part. The diagnosis is therefore performed directly on the moving part to be cleaned, so as to have precise information as to the level of defectiveness of said part and thereafter to adjust the cleaning sequence accordingly.

Alternatively, the diagnostic means can also be adapted to read a fault memory associated with the motorisation system and, if information relating to a fault in a moving part is stored in the fault memory, to determine the level of defectiveness of said moving part as a function of the stroke travelled between the two extreme positions of the moving part, as a function of the theoretical maximum stroke and as a function of the information relating to the fault read in the fault memory. The diagnostic means therefore take into account information already detected by the environment of the engine, to confirm or to refine the diagnosis arrived at.

The diagnostic means can also be adapted to determine the level of defectiveness of each successive moving part. Each moving part is therefore diagnosed independently of the others, to further refine the diagnosis of the motorisation system and to further improve the resulting cleaning sequence.

According to one embodiment, the diagnostic means are adapted, if the level of defectiveness of the moving part is greater than a predefined value, to command the execution of an initial cleaning sequence and then to determine again the level of defectiveness of said moving part and to report a failing moving part if the level of defectiveness again determined is greater than or equal to the level of defectiveness previously determined for said moving part. This makes it possible to avoid executing a complete cleaning cycle that is of no use if a moving part is too soiled to be cleaned correctly. Replacing the part is preferable in this case.

For their part, the control means are adapted:
  to determine the level of soiling of the motorisation system from the levels of defectiveness of the moving parts of the plurality of moving parts,
  as a function of the level of soiling of the motorisation system, to determine cleaning parameters of a cleaning sequence comprising a plurality of cleaning cycles, said cleaning parameters comprising a number of cleaning cycles and injection parameters comprising in particular for each cleaning cycle a duration of said cleaning cycle and/or a quantity of fluid to be injected during said cleaning cycle, and
  to command the execution of the cleaning sequence by the injection device in accordance with the injection parameters so determined.

Following the diagnosis, the control means therefore determine appropriate cleaning parameters for an effective cleaning sequence matched to the real state of the engine to be cleaned.

The injection parameters comprise in particular for each cleaning cycle a duration of said cleaning cycle and/or a quantity of fluid to be injected. They can also comprise:
  a temperature and/or a pressure of the injected fluid, and/or
  a state of the fluid to be injected, and/or
  a composition of the fluid to be injected, in particular a proportion of hydrogen.

According to one embodiment, the control means are also adapted:
  as a function of the level of soiling of the motorisation system and/or the levels of defectiveness of the moving parts of the plurality of moving parts, to determine movement parameters of at least one or of each moving part during a cleaning sequence, and
  in accordance with the movement parameters so determined, to command the movement of said or of each moving part during the cleaning sequence executed by the injection device.

During a cleaning sequence, a moving part is therefore driven in movement in accordance with movement parameters appropriate to the level of soiling of the motorisation system and/or to the levels of defectiveness of the moving parts. The movements of a moving part during the injection of cleaning fluid enable better management of the circulation of the cleaning fluid through the entire motorisation system for improved efficiency over all of the elements of the motorisation system and deeper and more effective cleaning of the moving part or parts itself/themselves. The moving parts are preferably moved successively, one after the other, so as to clean each moving part more effectively.

According to a complementary embodiment, the diagnostic means are adapted to determine the level of soiling of an engine as a function of the level of defectiveness of at least one (or more) of the moving parts of the plurality of moving parts and as a function of intrinsic parameters of the motorisation system including the engine. The intrinsic parameters of the motorisation system are for example parameters linked to the geometry of the engine or to the geometry of the circulation circuit: the number and the volume of the cylinders (at least one), the shape and the section of the inlet, the shape and the section of the gas pipes, . . . . Taking into account the intrinsic parameters of the motorisation system in addition to the level of defectiveness of one or more moving parts enables better definition of the level of soiling of the motorisation system and better definition of the conditions for optimal efficiency of the cleaning fluid when it circulates in the engine and the recirculation circuit.

According to a complementary embodiment, the diagnostic means are adapted to determine the level of soiling of an engine also as a function of conditions of use of the motorisation system. The conditions of use of the motorisation system comprise for example a number of kilometres travelled for a motor vehicle engine or a number of hours of use of the engine from an initial start-up or from a first cleaning, a qualitative parameter representative of the most frequent situation of use of the engine, for example an urban environment for a motorisation system of a motor vehicle, . . . .

The parameters of a cleaning sequence are therefore best adapted to the motorisation system to be treated, taking also into account the general state of the motorisation system, said state depending on the use that has been made of the motorisation system as well as on the maintenance that has been carried out on the motorisation system.

BRIEF DESCRIPTION OF THE FIGURES

The invention will be better understood and other features and advantages of the invention will become apparent in the light of the following description of embodiments of a cleaning installation in accordance with the invention. These examples are non-limiting examples. The description is to be read in conjunction with the appended drawings in which.

DESCRIPTION OF ONE EMBODIMENT OF THE INVENTION

Figure 1:
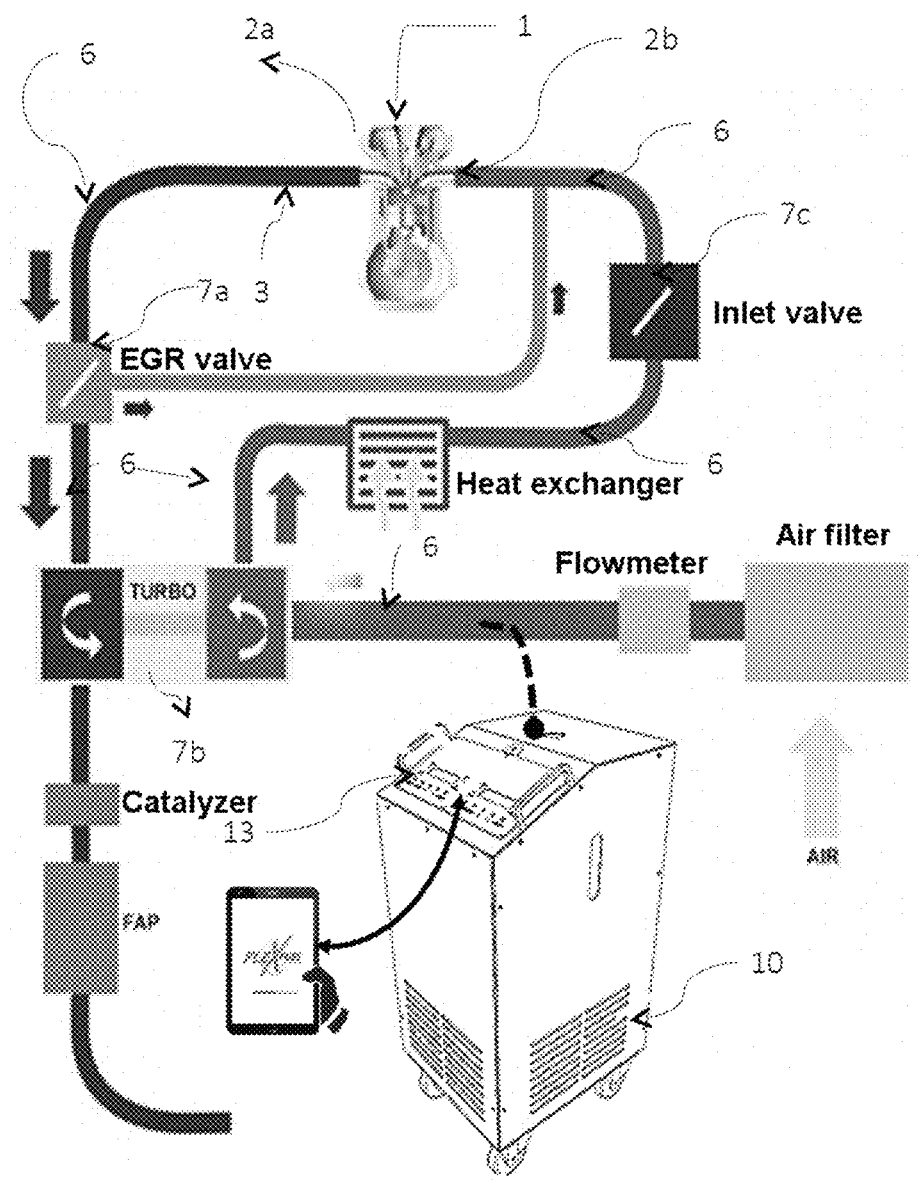
FIG. 1 is an overall view of a classic motorisation system of a motor vehicle, connected to an installation according to the invention.

As stated above, the installation according to the invention is an installation for cleaning a motorisation system comprising an internal combustion engine and a gas circulation circuit. FIG. 1 shows by way of example a known motorisation system for a motor vehicle, the gas circulation circuit of which motorisation system redirects some of the exhaust gases to one of the inlets of the engine.

The engine comprises a plurality of cylinders 1 (only one is shown in FIG. 1) each comprising a fuel inlet 2a (direct injection), an inlet 2b for a gas mixture containing air and an exhaust gas outlet 3, the gas inlet and the outlet are closed by moving valves. All the cylinders are identical and are fed with gas in parallel, each via its gas inlet. According to a variant that is not shown, the engine comprises a single inlet adapted to receive a fuel-air or fuel-air-exhaust gas mixture.

The gas circulation circuit from FIG. 1 is also known; it comprises a plurality of pipes 6 and a plurality of moving parts 7 arranged together to feed a gas mixture comprising some of the exhaust gases to the inlet of the engine. In particular, an EGR valve 7a enables some of the exhaust gases to be drawn off in order to reinject them directly at the inlet 2b. Driven by the exhaust gases, a turbocompressor 7b enables the inlet air pressure to be increased for better filling of the cylinder. The turbocompressor comprises a turbine situated in the exhaust pipe and a compressor situated in the air inlet pipe, the two members being connected by a shaft; a filter filters the air entering the turbocompressor and a flowmeter monitors the air flow rate entering the turbocompressor; a moving member of the turbocompressor adjusts the flow rate of air circulating in the turbocompressor. An inlet valve 7c at the air inlet of the cylinder enables the quantity of air injected into the cylinder to be regulated; between the outlet of the turbocompressor and the valve 7c, a heat exchanger cools the compressed air. The exhaust gases are conventionally evacuated via the turbine of the turbocompressor to a catalyzer and a particle filter and rejected to the atmosphere afterwards. A computer of the motorisation system controls the movements of the moving parts 7, notably the degree of opening of the EGR valve, the degree of opening of the inlet valve and the parameters of the turbocompressor as a function of the performance expected of the engine. Over time and as the engine is used, deposits of soot come progressively to limit the movements of the moving parts and the useable section of the gas pipes 6.

The cleaning installation comprises an injection device adapted to perform a sequence of cleaning the engine by injecting a cleaning fluid into one of the inlets of the engine to be cleaned.

In one embodiment, the cleaning fluid used by the cleaning installation is a mixture of hydrogen and oxygen and the installation is completely autonomous in the sense that it produces itself the cleaning fluid that it uses. To this end, the installation comprises, in a structure 10 in the form of a box, a water tank and known means for producing hydrogen and oxygen by a process of electrolysis of water. The installation also comprises a fluid injection device adapted to inject the cleaning fluid into the engine inlet. If the engine comprises a single inlet adapted to receive a gas mixture containing in particular air and fuel, an outlet of the injection device of the cleaning installation is connected to said inlet, on the upstream side of the inlet valve. If the engine comprises at least two inlets, the outlet of the injection device of the cleaning installation can be connected either to the inlet configured for receiving a gas mixture containing in particular air or to the inlet configured for receiving fuel (so-called direct injection engine). In the example from FIG. 1, the outlet of the injection device is connected (thick dashed lines) to the air inlet of the turbocompressor and is therefore connected to the inlet configured for receiving the gas mixture containing air.

On the top of the structure there is provided a user interface 13 enabling the user to adjust the installation, to enter parameters necessary for the operation of the installation, to trigger a cleaning sequence, to be informed of the progress of a cleaning sequence in progress, to control the moving members, . . . . The user interface comprises in particular an information display screen and means for selecting information displayed on the screen at a given time. The selection means comprise for example a mouse enabling the movement of a cursor on the screen, a touch-sensitive layer covering the display screen, . . . . In a variant, not shown in the figures, the user interface is portable (smartphone, tablet, laptop computer, . . . ) and communicates with the installation via a wireless link such as a Bluetooth link, a Wifi link, . . . .

Figure 2:
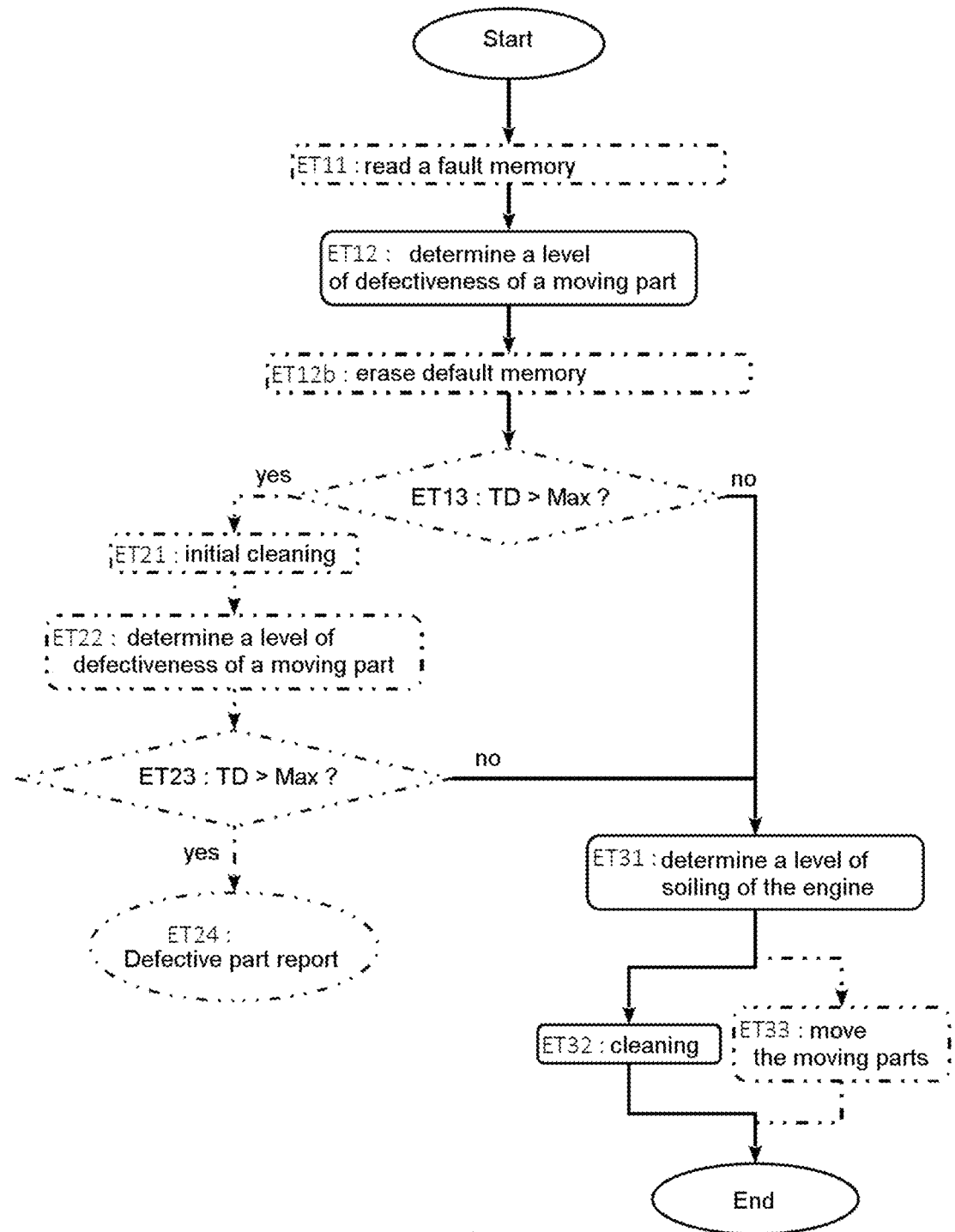
FIG. 2 is a diagram describing one mode of operation of the installation according to FIG. 1.

An installation according to the invention also comprises means for diagnosing the state of the motorisation system and control means for executing a cleaning sequence adapted according to the diagnosis performed. The essential technical functions of the diagnostic means and the control means are represented in solid line in FIG. 2. The additional functions are represented in dashed line.

From a practical implementation point of view, in the example used, the diagnostic means and the control means consist of a microprocessor associated with a program memory. The microprocessor is connected to the computer of the motorisation system controlling the overall operation of the motorisation system to be cleaned; the computer of the motorisation system in particular controls the movements of the moving parts. The microprocessor is also connected to the cleaning fluid injection device, the operation of which it controls. The program memory stores a program that can be executed by the microprocessor; said program comprises a plurality of lines of code appropriate for the execution of the functions of the diagnostic means and the functions of the control means in the context of the invention.

According to the invention, a diagnosis of the motorisation system is performed before it is cleaned.

First of all, a level of defectiveness of one moving part is determined (ET12). To this end, the microprocessor transmits to the computer of the motorisation system instructions that command the movement of said moving part between its two extreme positions, the other moving parts remaining immobile; the computer of the motorisation system moves said part and then, after movement of said moving part, transmits to the microprocessor a measurement of the two extreme positions of said moving part; the microcontroller then calculates the level of defectiveness of said part concerned.

The two extreme positions correspond to the open position and the closed position of the moving part concerned (EGR valve, inlet valve, moving member of the turbocompressor with variable geometry, etc.). If there is no soot impeding the operation of a moving part, the latter is movable over a theoretical maximum stroke C0 between a position in which the fluid flow rate is equal to 100% of the theoretical flow rate of the pipe on the upstream side of the moving part and a position in which the fluid flow rate through the moving part is zero. As the motorisation system is used, soot accumulates around the moving parts, with the result that a moving part opens less and less well (the maximum value of the flow rate that it allows decreases) and closes less and less well (the minimum value of the fluid flow rate increases and is no longer zero) with the result that its stroke C between its two extreme positions decreases over time. The stroke of the moving part therefore enables its level of defectiveness to be defined: $TD=(C0-C)/C0$.

It is to be noted that some moving parts move in translation, in which case the stroke of the part can correspond to a linear distance measured for example in millimetres; this is the case for example of the moving member of the turbocompressor or of the EGR valve. Other moving parts are mobile in rotation, in which case the stroke of the part can correspond to an angular distance measured for example in degrees; this is the case for example of the inlet valve. Alternatively, the degree of opening (expressed as a %) of a moving part can be used as a measurement of the stroke of the moving part; the degree of opening of a valve defines for example the proportion of gas that the valve allows to pass; the degree of opening of a valve is zero when it is totally closed and is equal to 100% when the valve is totally open; the stroke of the valve is thus equal to the maximum valve of the degree of opening less the minimum value of the degree of opening at the time of the diagnosis, the theoretical maximum stroke being equal to 100%.

The determination of the level of defectiveness is repeated for each moving part to diagnose the moving parts one after the other. The order in which the moving parts are diagnosed can be predefined and stored in the program memory. In the example used, for the efficiency of the diagnosis, before the diagnosis of the first moving part, the microcontroller transmits instructions to the usual computer of the motorisation system to read a fault memory of said computer (ET11). If it receives in return information relating to a fault of one of the moving parts, for example the EGR valve, the moving part having a fault is diagnosed first. After the fault memory is read (ET11) or after determination of the level of defectiveness (ET12), the fault memory can be erased (ET12b).

The microprocessor verifies if the level of defectiveness TD of a moving part is greater than a permitted maximum value (ET13). The permissible maximum value is for example TD=100%, which corresponds to a stroke C=0, i.e. to a part that can no longer move. As a safety measure, the permissible maximum value can be made equal to 90%. If the level of defectiveness TD of a moving part is greater than the permissible maximum value, the microprocessor transmits to the injection device appropriate injection parameters for the execution of an initial cleaning sequence (ET21); the initial sequence is for example brief (for example a single cleaning cycle lasting a few tens of minutes) but intense. After the initial cleaning sequence, the level of defectiveness of the same moving part is determined again (ET22): the microprocessor transmits instructions to the computer to command the movement of the same moving part between its two extreme positions and receives in return, after movement (or absence of movement) of the part, a measurement of its two extreme positions; if the two extreme positions of the part are the same as before, the level of defectiveness determined again is greater than the permissible maximum value (ET23), and this means that the initial cleaning has not made it possible to improve the general state of the part; in this case the microprocessor considers that even long and intensive cleaning has little chance of being effective and transmits to display means an alert advising that the moving part must be replaced (defective part alert).

In a concrete and definitely nonlimiting example, the initial cleaning sequence is for example brief, for example lasting of the order of 10 to 30 minutes, but intense with a cleaning fluid flow rate of the order of 700 l/hour, with in parallel with this alternating movement of the part in opening or in closing every 2 to 5 minutes.

Once the diagnosis has been obtained, the control means determine the overall level of soiling of the motorisation system (ET31) as a function of the level of defectiveness of each moving part. Depending on the embodiment used, the level of soiling of the motorisation system is made equal to the greatest of the levels of defectiveness of all the moving parts taken into account. According to another embodiment, the level of defectiveness of each moving part is weighted by a coefficient representative of the importance of a fault of said moving part in the normal operation of the engine or of the importance of the consequences of a fault of said moving part on the operation of the engine (permanent damage of the engine, high cost of replacing the moving part, high level of pollution generated, . . . ), after which the level of soiling of the motorisation system is determined as a function of the weighted levels of defectiveness of the moving parts taken into account.

Alternatively, to determine the overall level of soiling of the motorisation system, in addition to the levels of defectiveness of the moving parts, the control means can take into account intrinsic parameters of the motorisation system, such as for example:
  the geometry of the engine, the engine displacement, the number of cylinders, the volume of a cylinder, the type of fuel, . . . ,
  the air flow rate, the flow rate of exhaust gas admitted into the cylinder under normal operating conditions,
  the intrinsic parameters of the depollution systems associated with the motorisation system (for example an exhaust gas recirculation circuit with EGR valve and/or a particle filter FAP),
  the intrinsic parameters of the turbocompressor.

According to a further variant, which can optionally be combined with the previous one, the control means can also take into account conditions of use of the motorisation system, such as for example:
  a duration of use of the motorisation system, duration defined for example by a number of kilometres travelled by the vehicle in which the motorisation system is installed, a number of hours of operation of an industrial machine in which the motorisation system is installed, . . . ,
  a date operation of the motorisation system began (or a date circulation of the vehicle began),
  a weighting coefficient determined as a function of a normal situation in which the motorisation system is used most often (for example for a vehicle, use in towns, on a road, a motorway, mixed),
  a weighting coefficient determined as a function of the type of fuel used with the motorisation system,
  a weighting coefficient determined as a function of any additive added to the fuel of the motorisation system in order to limit its level soiling, . . . .

After the determination of the level of soiling of the motorisation system, the control means of the installation control a cleaning sequence comprising a plurality of cleaning cycles, at least one cycle. For this, as a function of the level of soiling of the motorisation system, the control means determine cleaning parameters (ET32); said cleaning parameters comprise in particular a number of cleaning cycles and injection parameters comprising for each cleaning cycle a duration of said cleaning cycle and/or a quantity of fluid to be injected during said cleaning cycle. The injection parameters can also comprise, for each cleaning cycle:
  a temperature and/or a pressure of the fluid, and/or
  a state of the fluid to be injected, and/or
  a composition of the fluid to be injected, in particular a proportion of hydrogen.

The control means then command the injection device to execute the cleaning sequence in accordance with the injection parameters so determined (ET32).

In the example also used, the control means are also adapted (ET33):
- as a function of the level of soiling of the motorisation system and/or the levels of defectiveness of the moving parts of the plurality of moving parts, to determine movement parameters of at least one or each moving part during a cleaning sequence, and
- in accordance with the movement parameters so determined, to command the movement of said or each moving part during the cleaning sequence executed by the injection device.

In a concrete and definitely nonlimiting example, three cleaning cycles are executed successively, each lasting 30 minutes to 1 hour 30 minutes, during which cycles the cleaning fluid used is a stoichiometric mixture of oxygen and hydrogen gas with a flow rate from 500 l/h to 700 l/h. During the first cycle, the EGR valve is moved: the valve is opened 50% (it allows to pass 50% of the gas that it receives) at the beginning of the first cycle for a first predefined time from 2 to 10 minutes, after which the EGR valve is opened 0% (valve closed) for a second predefined time of the order of 2 to 10 minutes, after which, for a third predefined time of the order of 5 to 15 minutes, the EGR valve is alternately opened and closed (extreme positions) approximately every 0.5 s (alternating operation). During the second cycle, the inlet valve is moved in a similar manner. During the third cycle, the moving member of the turbocompressor is moved in a similar manner. For each cycle, the flow rate, the temperature and the pressure of the cleaning fluid are adjusted as a function of the level of defectiveness of the moving part moved during said cycle.

LEGEND

1. Cylinder
2a. Fuel inlet
2b. Gas inlet
3. Exhaust gas outlet
6. Gas pipes
7. Moving parts
7a. EGR valve
7b. Turbocompressor
7c. Inlet valve
10. Box
13 User interface

The invention claimed is:

1. An apparatus comprising an installation for cleaning a motorization system that comprises an engine, a gas-circulation circuit, and an exhaust-gas outlet, wherein said engine is an internal-combustion engine that comprises inlets that are configured for receiving combustible products, wherein said gas circulation circuit comprises pipes and moving parts arranged together to feed a gas mixture to one of said inlets, wherein said moving parts comprise a first moving part, wherein said installation comprises an injector, a diagnostic device, and a controller, wherein said injector is configured to execute a cleaning sequence for cleaning said motorization system by injecting a cleaning fluid into one of said inlets, wherein said diagnostic device is configured to estimate a soiling level as a function of a defect level, said soiling level being indicative of a level of soiling of said motorization system and said defect level being indicative of a level of defectiveness of said first moving part, and wherein said controller is configured to supply cleaning parameters to said injection devices for execution of said cleaning sequence, said cleaning parameters being a function of said soiling level.

2. The apparatus of claim 1, wherein said motorization system comprises a gas circulation circuit adapted to feed, to one of said inlets, a gas mixture that comprises exhaust gas available at said exhaust outlet.

3. The apparatus of claim 1, wherein said moving parts comprise a part selected from the group comprise an inlet valve, an EGR valve, and a moving member of a turbo compressor.

4. The apparatus of claim 1, wherein said diagnostic device is configured to cause said first moving part to execute an actual stroke between extreme positions, wherein, in the absence of any defect in said first moving part, said actual stroke is equal to a theoretical maximum stroke, wherein a second moving part is retained in a fixed position, wherein said diagnostic device is configured to estimate said level of defectiveness as a function of said actual stroke and said theoretical maximum stroke.

5. The apparatus of claim 1, further comprising a fault memory associated with said motorization system, said fault memory having stored therein fault information relating to a fault in said first in said first moving part, wherein said diagnostic device is configured to cause said first moving part to execute an actual stroke between extreme positions, wherein, in the absence of any defect in said first moving part, said actual stroke is equal to a theoretical maximum stroke, wherein said diagnostic device is adapted to read said fault information, to estimate said level of defectiveness of said first moving part as a function of said fault information and of an extent to which said actual stroke and theoretical maximum stroke differ.

6. The apparatus of claim 1, wherein said diagnostic device is configured to cause each of first moving part to execute an actual stroke between extreme positions, wherein, in the absence of any defect in said first moving part, said actual stroke is equal to a theoretical maximum stroke, wherein said diagnostic device is configured to estimate a level of defectiveness for all of said moving parts as a function of said actual strokes and said theoretical maximum strokes.

7. The apparatus of claim 1, wherein, after having estimated said level of defectiveness to exceed a predefined value, said diagnostic device is configured to cause execution of an initial cleaning sequence, to again estimate said level of defectiveness, to report said first moving part as having failed if said level of defectiveness fails to improve after said initial cleaning sequence.

8. The apparatus of claim 1, wherein said diagnostic device is configured to estimate said soiling level as a function of estimates of levels of defectiveness of said moving parts, including said level of defectiveness of said first moving part, wherein said diagnostic device is further configured to use said estimated soiling level of said motorization system to determine cleaning parameters of a cleaning sequence comprising a plurality of cleaning cycles, said cleaning parameters comprising a number of cleaning cycles and injection parameters that specify, for each of said cleaning cycles, at least one of a duration of said cleaning cycle and a quantity of cleaning fluid to be injected during said cleaning cycle, and wherein said controller is configured to cause execution of said cleaning sequence by said injection device in accordance with said injection parameters.

9. The apparatus of claim 8, wherein said injection parameters transmitted to the injection device comprise a temperature of said cleaning fluid.

10. The apparatus of claim 8, wherein said injection parameters transmitted to the injection device comprise a pressure of said cleaning fluid.

11. The apparatus of claim 8, wherein said injection parameters transmitted to the injection device comprise a state of said cleaning fluid.

12. The apparatus of claim 8, wherein said injection parameters transmitted to the injection device comprise a composition of said cleaning fluid.

13. The apparatus of claim 8, wherein said injection parameters transmitted to the injection device comprise a proportion of hydrogen in said cleaning fluid.

14. The apparatus of claim 8, wherein said controller is further configured to determine a movement parameter of said first moving part as a function of said estimated soiling level of said motorization system and to cause movement of said first moving part that is consistent with said moving parameters during execution of said cleaning sequence.

15. The apparatus of claim 8, wherein said controller is further configured to determine a movement parameter of said first moving part as a function of levels of defectiveness of said moving parts and to cause movement of said first moving part that is consistent with said moving parameters during execution of said cleaning sequence.

16. The apparatus of claim 8, wherein said diagnostic device is configured to estimate a level of soiling of said engine based at least in part on levels of defectiveness of said moving parts and intrinsic parameters of said engine.

17. The apparatus of claim 8, wherein said diagnostic device is configured to estimate a level of soiling of said engine at least in part based on conditions of use of said motorization system.

* * * * *